Dec. 11, 1956  J. J. LAWICK  2,773,953
VEHICLE SAFETY SWITCH

Filed Nov. 4, 1954  2 Sheets-Sheet 1

INVENTOR.
Julius J. Lawick
BY
Hamilton & Hamilton
Attorneys.

Dec. 11, 1956 J. J. LAWICK 2,773,953
VEHICLE SAFETY SWITCH
Filed Nov. 4, 1954 2 Sheets-Sheet 2

INVENTOR.
Julius J. Lawick
BY Hamilton & Hamilton
Attorneys.

United States Patent Office 2,773,953
Patented Dec. 11, 1956

2,773,953

VEHICLE SAFETY SWITCH

Julius J. Lawick, Kansas City, Kans.

Application November 4, 1954, Serial No. 466,791

6 Claims. (Cl. 200—61.51)

This invention relates to new and useful improvements in vehicle safety switches, and has particular reference to safety switches of the class adapted to be mounted on an automobile, truck, tractor, or other self-propelled vehicle and operable responsively to a tilting of the vehicle either to give a danger signal, or to shut off the vehicle engine, or both, when the vehicle becomes tilted to such a degree that further operation is not safe due to danger of overturning.

The principal object of the present invention is the provision of a safety switch of the class described which will operate to actuate a signal when the vehicle tilts to a degree somewhat less than the danger angle, to give warning that the vehicle is approaching a dangerous angle of tilt, and which further will function to shut off the vehicle engine if the operator disregards the warning signal and drives the vehicle into a position of still greater tilt.

Another object is the provision of a safety switch of the class described which, though operated by a pivotally supported pendulum, will not "flutter," or switch rapidly on and off, due to jarring or vibration when the vehicle is positioned at or close to the danger angle, but on the contrary will shut off positively and definitely at a given angle of tilt. "Fluttering" has been a definite disadvantage in most switches of this general type, since they often kill the engine at the very moment the operator most needs it to move the vehicle into a safer position.

A further object is the provision of novel means for adjusting the switch to vary the angle at which it will shut off the engine of the vehicle.

Other objects are simplicity and economy of construction, efficiency and dependability of operation, and adaptability for use in virtually any type of self-propelled vehicle.

With these objects in view, as well as other objects which will appear in the course of the specification, reference will be had to the drawing, wherein.

Figure 1:
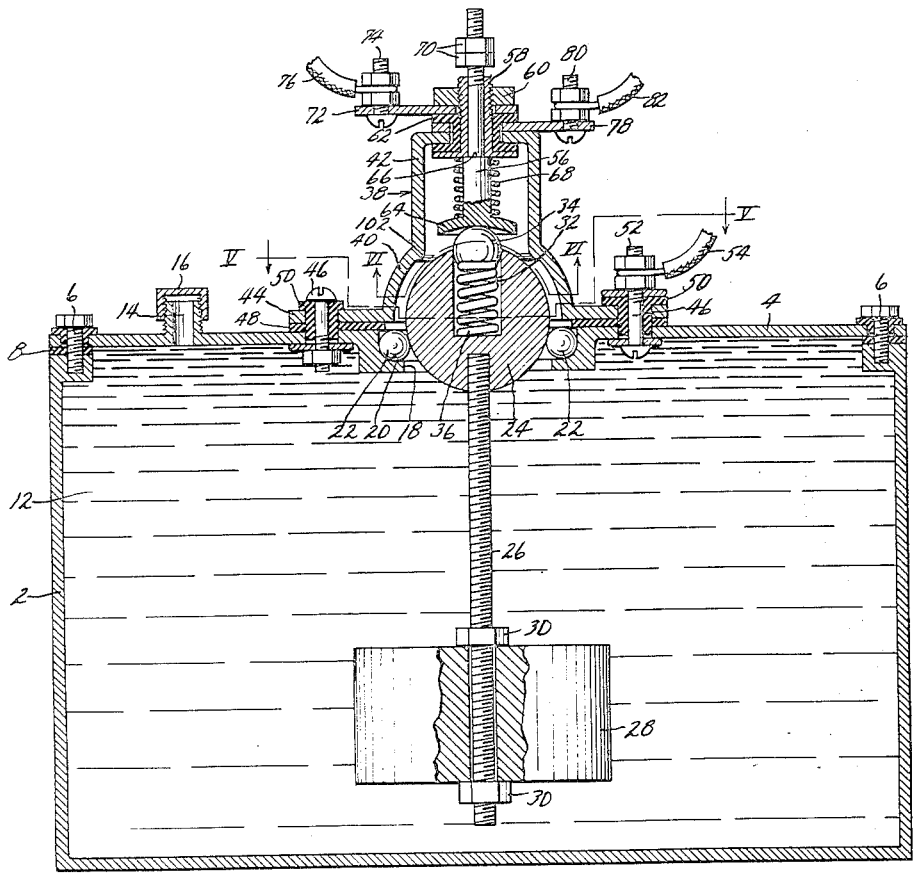
Fig. 1 is a vertical mid-sectional view of a vehicle safety switch embodying the present invention, with parts left in elevation and parts broken away.

Like reference numerals apply to similar parts throughout the several views, and the numeral 2 applies to a hollow, cylindrically shaped housing made of any suitable material. It is provided with a circular cover plate 4 made of an electrical conducting material. Said cover is secured to the housing by screws 6, and is insulated therefrom by gasket 8 and screw bushings 10. The housing is normally filled with a heavy oil 12 or other viscous liquid for a purpose to be described, the cover 4 being provided with a filling opening 14 which is normally closed by a screw cap 16. A circular orifice 18 is formed centrally in cover 4, said orifice being surrounded by a circular ball race 20 which carries a plurality of bearing balls 22. Said bearing balls support a switch member 24 having the form of a spherical ball for universal pivotal movement.

A threaded rod 26 is screwed radially into ball 24, and depends downwardly into housing 2. A weight 28 is disposed slidably on said rod, and is secured for adjustable movement therealong by a pair of lock nuts 30. A radial bore 32 is formed in ball 24 at a position diametrically opposite rod 26, and carries a spherical contact ball 34 slidably therein, said ball being urged outwardly by a compression spring 36 disposed in said bore. A hollow cap 38 is positioned over that portion of ball 24 extending above cover 4. Said cap comprises a spherically curved portion 40 concentric with ball 24 but of larger diameter than said ball, and an upwardly projecting cylindrical extension 42, and is provided at its lower end with a circular flange 44 which is secured to cover 4 by bolts 46. Cap 38 is electrically insulated from cover 4 by an insulating gasket 48 disposed therebetween. Bolts 46 contact cover 4, but are insulated from cap 38 by insulating bushings 50. One of bolts 46, further designated by the numeral 52, forms a terminal post by means of which a circuit wire 54 may conveniently be connected to cover 4.

Arranged axially in cap extension 42 is a plunger 56, said plunger being carried for longitudinal sliding movement in a sleeve 58 secured in the upper end of extension 42 by nut 60, said sleeve being insulated from cap 38 by insulating bushing 62. The inner end of said plunger is formed to present a circular head 64, the outer or lower face of which is normally engaged by ball 34 and is spherically dished as shown. The outward movement of said plunger is limited by the engagement of a shoulder 66 formed thereon with the inner end of sleeve 58. In this position the spherical face of plunger head 64 is concentric with ball 24, but is of greater radius than the inner surface of the spherical portion 40 of the cap. A compression spring 68 coiled about plunger 56 bears at one end against head 64 and at its opposite end against sleeve 58, thereby urging the plunger inwardly. However, spring 68 is weaker than spring 36, and the plunger is therefore normally held in its elevated position with shoulder 66 engaging sleeve 58. The inward movement of plunger 56, when permitted as describd below, is limited by a pair of lock nuts 70 threaded on the outwardly extended end of said plunger and adapted to engage the outer end of sleeve 58. The spacing of nuts 70 from sleeve 58, when ball 34 is in engagement with the plunger, is normally less than the spacing between plunger head 64 and ball 24.

A contact strip 72 is fixed at one end on sleeve 58 in electrical contact therewith by nut 60, and carries at its outer end a terminal post 74 to which a wire 76 is attached. Nut 60 also secures another contact strip 78 in electrical contact with cap 38, said strip being insulated from sleeve 58 by insulating bushing 62, and carrying at its outer end a terminal post 80 to which wire 82 is attached. It will of course be understood that all of the terminal posts, contact strips, sleeve 58, plunger 56, ball 34, spring 36, ball 24, bearing balls 22, cover 4, and cap 38 are of electrical conducting material.

Figure 2:
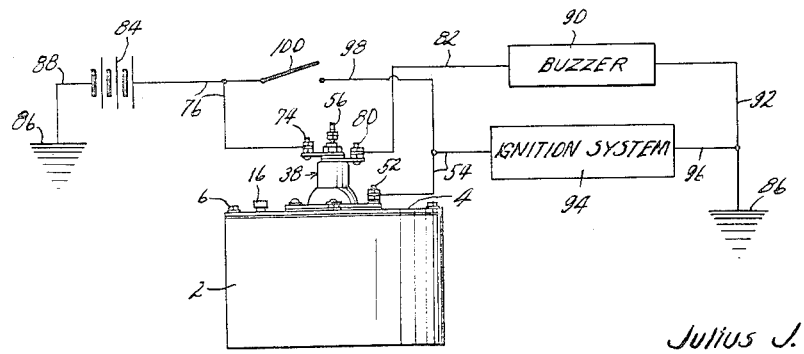
Fig. 2 is a wiring diagram of a sample installation of the switch.

Referring to Fig. 2, it will be seen that the vehicle battery 84 has one terminal grounded to the vehicle frame 86 by wire 88, and its other terminal connected to terminal post 74 of the switch by wire 76. Terminal post 80 of the switch is connected by wire 82 with a buzzer 90, said buzzer being grounded to frame 86 by wire 92. Terminal post 52 of the switch is connected by wire 54 with the ignition system 94 of the vehicle to furnish operating current to the same. The ignition system may be conventional, and is not here detailed. It is grounded to frame 86 by wires 96 and 92. There is a by-pass circuit between terminal posts 74 and 52 formed by a wire 98 connecting wires 76 and 54, and a normally open switch 100 is connected in said by-pass wire 98.

In use, the switch is installed in the vehicle in an upright position as shown in Fig. 1, so that when the vehicle is level, the rod 26 and plunger 56 are substantially coaxial, with ball 34 disposed substantially centrally of plunger head 64. In this position it will be seen that a circuit is established from battery 84 through wire 76, terminal post 74, contact strip 72, sleeve 58, plunger 56, ball 34, spring 36, ball 24, balls 22, cover 4, terminal post 52, wire 54, ignition system 94, wires 96 and 92, frame 86 and wire 88 to the battery. The ignition system, and the vehicle, may be operated in the usual manner so long as this ignition circuit is maintained, and said circuit will obviously be maintained as long as ball 34 remains in contact with plunger head 64.

Figure 3:
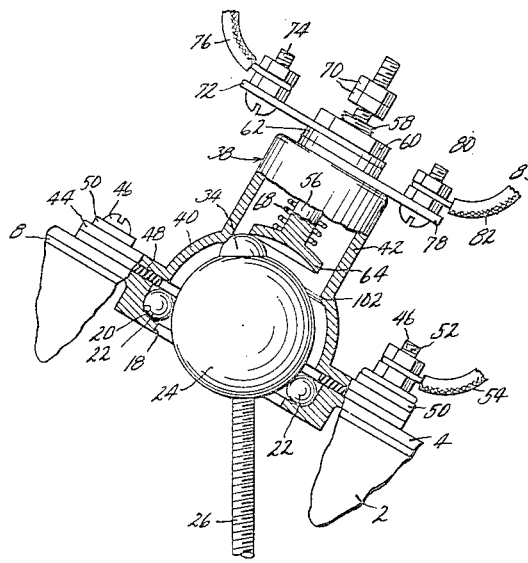
Fig. 3 is a fragmentary view similar to Fig. 1, with other parts left in elevation and partially broken away, with the switch tilted to a position to cause operation of the warning signal.

When the vehicle is driven onto inclined ground, it is apparent that rod 26 will be maintained vertical by the force of gravity on weight 28, while housing 2, cover 4 and cap 38, and the parts carried thereby, will be tilted with the vehicle. The parts are so proportioned that when the vehicle is tilted to a degree somewhat less than that at which there is actual danger of overturning, that portion of cap 38 at the juncture of the spherical portion 40 and cylindrical portion 42 thereof engages ball 34, as shown in Fig. 3. This portion of the cap may be formed with a circular lip 102 which projects inwardly of the inner periphery of spherical portion 40. Whenever lip 102 engages ball 34, as in Fig. 3, current is furnished from plunger 56 through ball 34, cap 38, contact strip 78, wire 82, buzzer 90, wire 92, frame 86, and wire 88 back to the battery, thereby completing an operative circuit to said buzzer and placing it in operation. The buzzer serves as a warning to the operator that his vehicle is approaching a dangerous angle of tilt. However, since ball 34 is still in engagement with plunger head 64 at this time, the ignition circuit is not interrupted and the vehicle may continue to operate.

It will be seen that as the angle of tilt approaches the angle at which the buzzer is operated, any free swinging of weight 28 in housing 2, such as could be caused by the vibration, swaying, or jostling of the vehicle, can result in an intermittent make-and-break contact between ball 34 and lip 102, which of course would cause intermittent operation of the buzzer. Since this is objectionable, the housing 2 is filled with heavy oil 12, or other viscous liquid, which serves largely to dampen any free oscillatory movement of the weight 28, and thereby keep it hanging steadily in a vertical position. It is of course obvious that in place of buzzer 90, any other electrically actuated visual or audible signal could be used if desired.

If the operator disregards the warning signal and moves the vehicle into a position of still greater tilt, the pendulum constituted by balls 24 and 34, rod 26, and weight 28 attempts to retain its vertical position, thereby forcing ball 34 against lip 102. Said ball cannot at first pass over the lip, since to do so it must be forced inwardly into bore 32 of ball 24 against the pressure of spring 36. Hence the pendulum is forced out of its vertical position as shown in dotted lines in Fig. 4. Eventually, however, the leverage force on ball 34 caused by moving pendulum weight 28 out of vertical will be sufficient to cam said ball inwardly, and the parts will have the position shown in solid lines in Fig. 4. Plunger 56 is forced inwardly by spring 68, but is prevented from moving into contact with ball 24 by the engagement of stop nuts 70 with the outer end of sleeve 58, as shown. Both the ignition and warning circuits are thereby broken, and the vehicle engine is shut off.

The force tending to cam ball 34 over lip 102, for any degree of tilt of the pendulum from vertical, depends on the leverage exerted by weight 28 due to its displacement from the vertical, and since the displacement for any angle of tilt can be varied by adjusting weight 28 longitudinally along rod 26, it is apparent that said adjustment of weight 28 serves as a means for adjusting the switch to interrupt the ignition circuit at any desired angle over a substantial range. The switch may thus be adapted to function efficiently on different types of vehicles.

While ball 34 is resting against lip 102 and is being urged thereagainst by the pendulum, it will be seen that despite the dampening effect of the oil 12 on the pendulum, vibration of the vehicle might cause intermittent partial camming of ball 34 away from plunger head 64, if the plunger were fixed. This could occur before the angle of tilt was sufficiently great for the pendulum to cam the ball entirely over lip 102. As a result, this might cause an intermittent making and breaking of the ignition circuit. This would cause a sputtering or complete killing of the engine at the very moment full power is most needed if the operator is trying to move the vehicle to a safer position. This has been a disadvantage of many pendulum-operated safety switches. To prevent this occurrence, plunger 56 is movable inwardly by spring 68 to follow and maintain contact with ball 34 during any slight inward movement of said ball. Only when said ball is cammed almost entirely to its retracted position will the stop nuts arrest the movement of the plunger and cause the contact to be broken.

Figure 4:
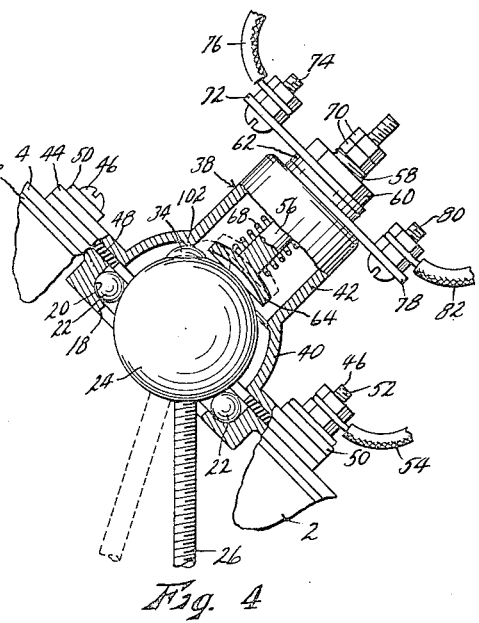
Fig. 4 is a view similar to Fig. 3 showing the switch tilted to a still greater angle to cause interruption of the motor ignition circuit.
Figure 5:
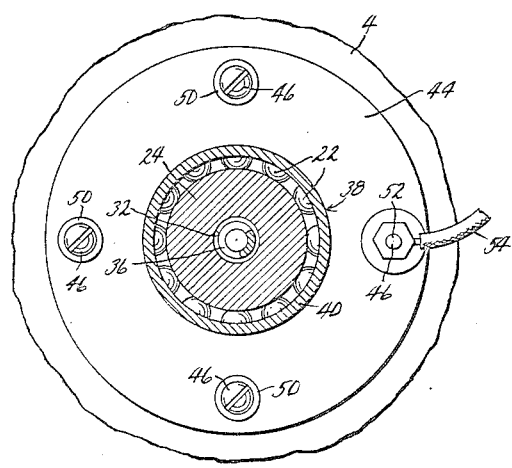
Fig. 5 is a fragmentary sectional view taken on line V—V of Fig. 1.
Figure 6:
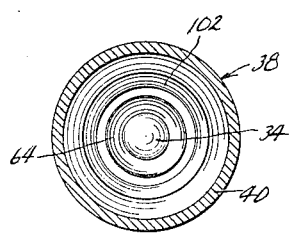
Fig. 6 is a sectional view taken on line VI—VI of Fig. 1.

It is of course contemplated that when the ignition circuit is broken, and the parts are positioned as shown in solid lines in Fig. 4, the vehicle will still not have actually overturned. After the operator has taken whatever safety precautions may be indicated, he may close switch 100 manually. This by-passes the safety switch and permits the engine to be started in the usual manner, so that the vehicle may be moved to a safe position under its own power. If for any reason it is desired that the safety switch shall temporarily operate only as a warning device, and not control the ignition circuit, stop nuts 70 may be threaded outwardly on plunger 56 to such an extent that when ball 34 is cammed inwardly by lip 102, the plunger will be moved inwardly by spring 68 far enough to move head 64 thereof into engagement will ball 36 or ball 24, thereby maintaining the ignition circuit closed.

While I have shown and described a specific embodiment of my invention, it will be apparent that many minor changes of structure and operation could be made without departing from the spirit of the invention as defined by the scope of the appended claims.

What I claim as new and desire to protect by Letters Patent is:

1. A safety switch for vehicles comprising a housing, a pendulum supported adjacent its upper end in said housing for universal pivotal movement, and normally hanging with its axis in a vertical position, a cap carried by said housing and including a circular lip disposed concentrically of the axis of said pendulum at the upper end thereof, a plunger carried by said cap but insulated therefrom, the lower end thereof being disposed concentrically of said lip but at a greater distance from the pivot of said pendulum than said lip, a contact member carried by said pendulum at the upper end thereof for axial movement relative thereto, and resilient means carried by said pendulum and urging said contact member resiliently against said plunger, whereby as said housing is tilted, said lip will engage and cam said contact member out of engagement with said plunger, said plunger and contact member serving as the contact members of a switch.

2. The structure as set forth in claim 1 wherein said cap is insulated from said housing, and said lip forms a third contact member for the switch, whereby one circuit may be completed from the plunger to the contact member, and a second circuit may be completed from the plunger to the lip through said contact member.

3. The structure as set forth in claim 1 wherein said pendulum includes a dependent rod and an enlarged weight, secured to the lower end of said rod, and with the addition of means operable to move said weight adjustably along said rod.

4. The structure as set forth in claim 1 wherein said pendulum includes a dependent rod and an enlarged weight secured to the lower end of said rod, said weight being disposed within said housing, and with the addition of a viscous liquid filling said housing around said weight, and means operable to move said weight adjustably along said rod.

5. The structure as set forth in claim 1 wherein said plunger is carried movably in said cap for movement toward and from the pivot of said pendulum, stop means limiting the outward movement of said plunger in a normal position for engagement by said contact member, resilient means urging said plunger inwardly with a force less than that of the resilient means urging said contact member against said plunger, and stop means normally limiting the inward movement of said plunger to a distance such that said plunger can follow and maintain engagement with said contact member during only a portion of the movement of the latter as it is cammed away from said plunger by said lip.

6. The structure as set forth in claim 1 wherein said plunger is carried movably in said cap for movement toward and from the pivot of said pendulum, stop means limiting the outward movement of said plunger in a normal position for engagement by said contact member, resilient means urging said plunger inwardly with a force less than that of the resilient means urging said contact member against said plunger, and stop means normally limiting the inward movement of said plunger to a distance such that said plunger can follow and maintain engagement with said contact member during only a portion of the movement of the latter as it is cammed away from said plunger by said lip, said last named stop means being adjustable whereby to permit movement of said plunger to engage said contact member even when the latter has been entirely retracted by said lip, and wherein said cap is insulated from said housing and said lip forms a switch contact, whereby a circuit may be completed from said plunger to said lip through said contact member.

References Cited in the file of this patent
UNITED STATES PATENTS

| | | |
|---|---|---|
| 1,175,062 | Johnson | Mar. 14, 1916 |
| 1,331,650 | Kruse | Feb. 24, 1920 |
| 2,013,924 | Nolte | Sept. 10, 1935 |
| 2,586,384 | Rudisill | Feb. 19, 1952 |